United States Patent
Klicpera

(10) Patent No.: US 9,297,150 B2
(45) Date of Patent: Mar. 29, 2016

(54) WATER USE MONITORING APPARATUS AND WATER DAMAGE PREVENTION SYSTEM

(71) Applicant: Michael Edward Klicpera, La Jolla, CA (US)

(72) Inventor: Michael Edward Klicpera, La Jolla, CA (US)

( * ) Notice: Subject to any disclaimer, the term of this patent is extended or adjusted under 35 U.S.C. 154(b) by 170 days.

(21) Appl. No.: 13/776,963

(22) Filed: Feb. 26, 2013

(65) Prior Publication Data

US 2014/0238511 A1     Aug. 28, 2014

Related U.S. Application Data

(60) Continuation-in-part of application No. 13/541,819, filed on Jul. 5, 2012, which is a continuation-in-part of application No. 13/216,521, filed on Aug. 24, 2011, now Pat. No. 8,347,427, and a continuation-in-part of (Continued)

(51) Int. Cl.
    *F16K 31/02*     (2006.01)
    *E03B 7/07*     (2006.01)
    *F16K 31/05*     (2006.01)

(52) U.S. Cl.
    CPC .............. *E03B 7/071* (2013.01); *F16K 31/02* (2013.01); *F16K 31/05* (2013.01); *Y10T 137/8158* (2015.04)

(58) Field of Classification Search
    CPC .......... E03B 7/071; F16K 31/02; F16K 31/05
    USPC ................... 137/624.12; 251/129.03, 129.04
    See application file for complete search history.

(56) References Cited

U.S. PATENT DOCUMENTS

| | | | |
|---|---|---|---|
| 2,798,503 A | 7/1957 | Carver | |
| 3,472,253 A | 10/1969 | Bartz | |
| 4,589,435 A | 5/1986 | Aldrich | |
| 5,000,224 A | 3/1991 | Olson | |
| 5,236,002 A | 8/1993 | Martin | |
| 5,539,384 A | 7/1996 | Frasier | |
| 5,971,011 A | 10/1999 | Price | |
| 6,237,618 B1 * | 5/2001 | Kushner | E03B 7/071 137/487.5 |
| 6,357,467 B1 | 3/2002 | Ringer | |
| 6,532,979 B1 | 3/2003 | Richter | |

(Continued)

OTHER PUBLICATIONS

U.S. Appl. No. 12/945,206, Oct. 13, 2011, Nicholas Konavalski.

(Continued)

*Primary Examiner* — Matthew W Jellett
(74) *Attorney, Agent, or Firm* — Michael Edward Klicpera

(57) ABSTRACT

The present invention is a water damage prevention system that has a residential or industrial/commercial facility water supply interruption system. The system is comprised of a remotely controllable base station with shut-off/on mechanism that is in wireless or wired communication with a convenient controller. The base station with shut-off/on mechanism is interposed within a water line from a water main to the living or operating quarters portion of a residential or a industrial/commercial facility or building, such that activation of the base station with shut-off/on valve operates to prevent flow of water from the water main to the living quarters when the residential home or industrial/commercial facility or building is vacated or unsupervised. In this manner, damage to the living quarters or the industrial/commercial facility or building from failure of water pipes running through the living or working quarters is prevented during times that the shut-off mechanism is activated.

28 Claims, 9 Drawing Sheets

Related U.S. Application Data application No. 13/216,497, filed on Aug. 24, 2011, now Pat. No. 8,887,324, which is a continuation-in-part of application No. 12/986,341, filed on Jan. 8, 2011, which is a continuation-in-part of application No. 12/877,094, filed on Sep. 7, 2010, which is a continuation-in-part of application No. 12/539,150, filed on Aug. 11, 2009, now Pat. No. 9,061,307, and a division of application No. 11/877,860, filed on Oct. 4, 2007.

(60) Provisional application No. 61/729,653, filed on Nov. 26, 2012.

(56) References Cited

U.S. PATENT DOCUMENTS

| | | | | |
|---|---|---|---|---|
| 6,556,142 | B2* | 4/2003 | Dunstan | 340/606 |
| 7,137,614 | B2 | 11/2006 | Masui | |
| 7,147,204 | B2* | 12/2006 | Hollingsworth et al. | 251/129.04 |
| 7,441,560 | B2 | 10/2008 | Sonoda | |
| 7,559,529 | B2* | 7/2009 | Affaticati et al. | 251/129.04 |
| 7,900,650 | B1* | 3/2011 | Wilson | 137/601.14 |
| 8,028,355 | B2* | 10/2011 | Reeder et al. | 4/623 |
| 8,857,466 | B1* | 10/2014 | Wilson | 137/599.11 |
| 2005/0235306 | A1* | 10/2005 | Fima | 725/10 |
| 2006/0137090 | A1* | 6/2006 | Jeffries | G01M 3/2807 4/664 |
| 2010/0307600 | A1* | 12/2010 | Crucs | 137/2 |
| 2011/0114202 | A1* | 5/2011 | Goseco | 137/487.5 |
| 2013/0248023 | A1* | 9/2013 | Estrada, Jr. | 137/551 |
| 2015/0013772 | A1* | 1/2015 | Patel et al. | 137/1 |

OTHER PUBLICATIONS

U.S. Appl. No. 13/741,460, May 23, 2013, Hong Kun Shin.

* cited by examiner

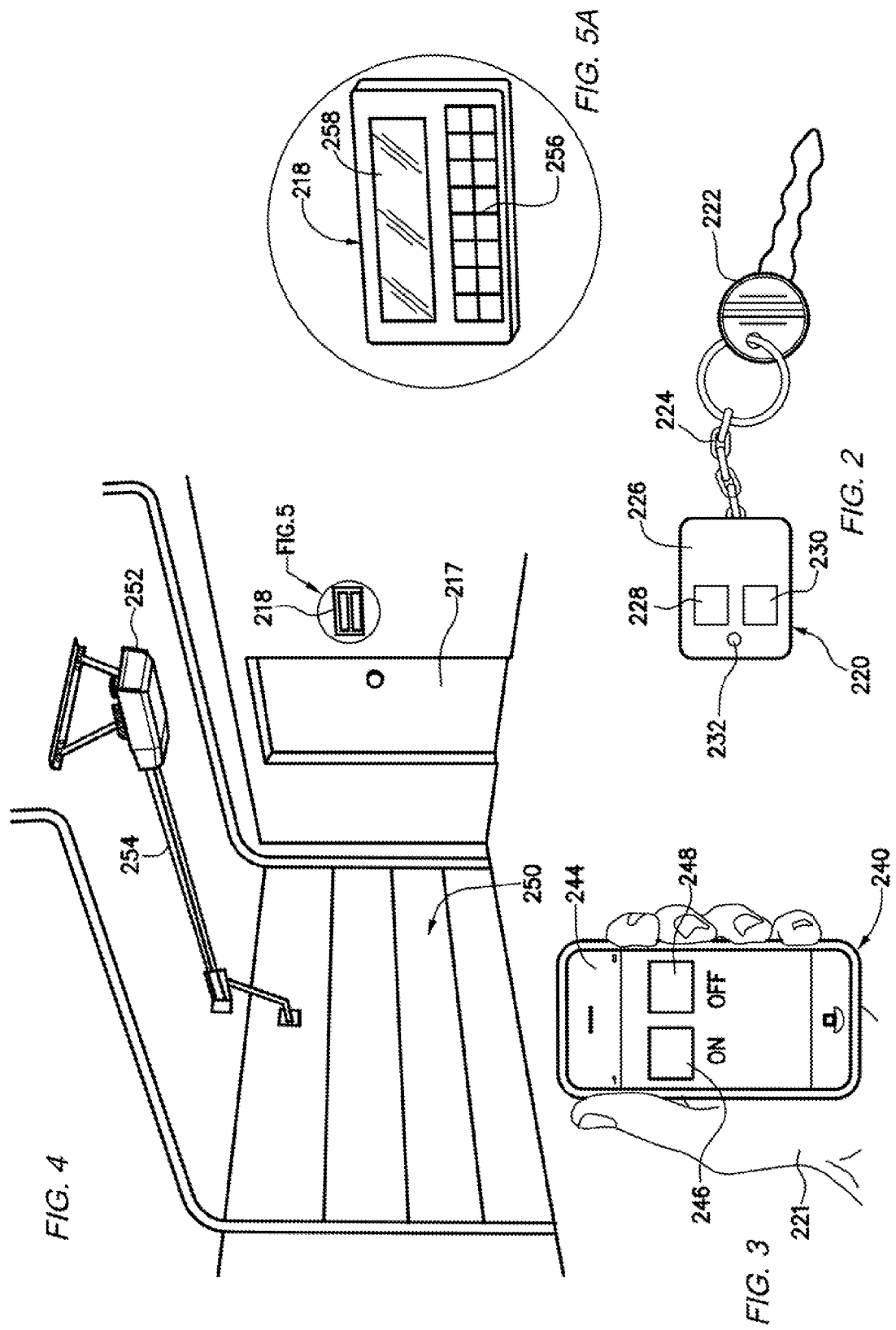

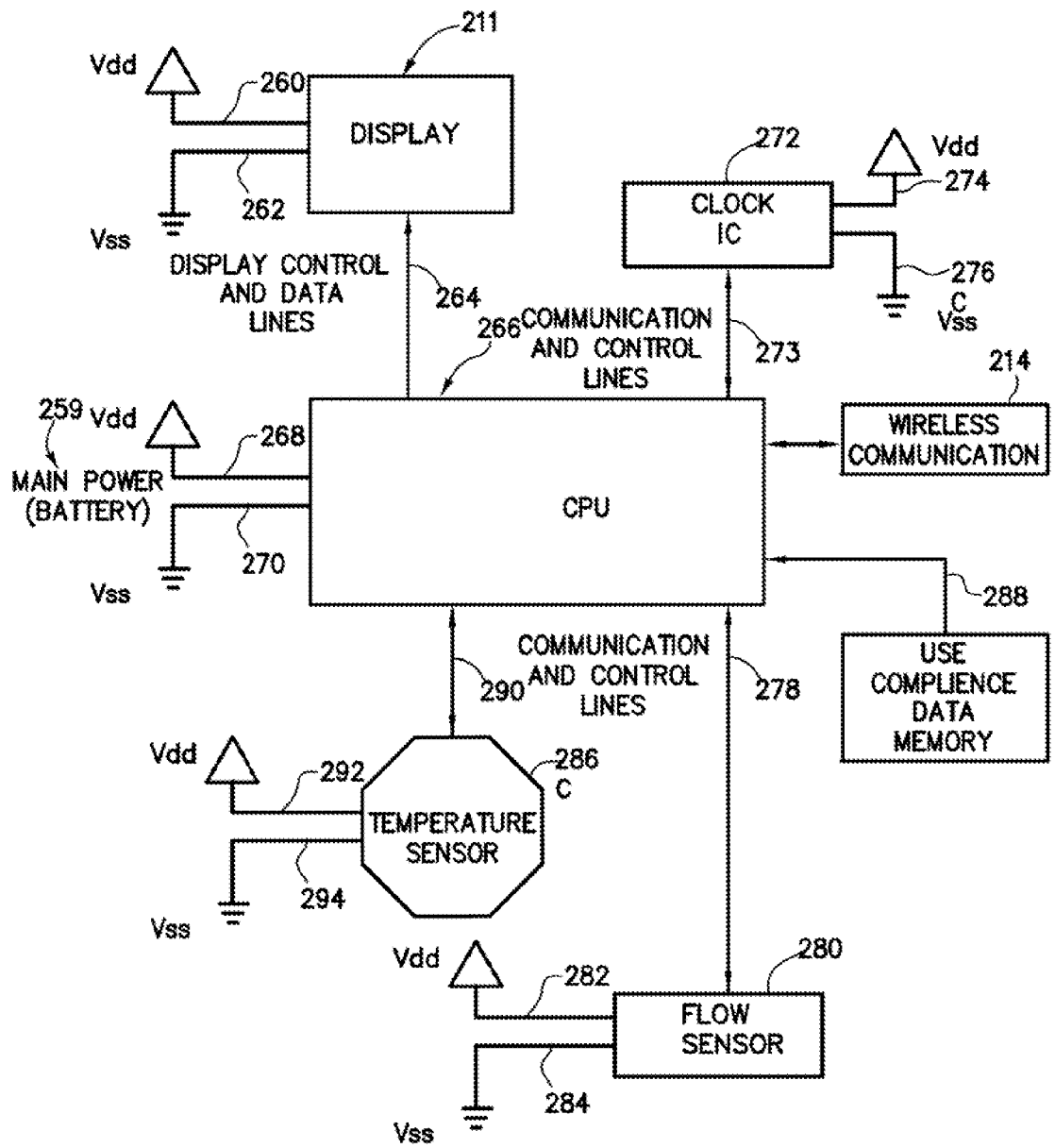

WATER USE MONITORING APPARATUS AND WATER DAMAGE PREVENTION SYSTEM

RELATED APPLICATIONS

This application is a continuation-in-part of U.S. patent application Ser. No. 11/877,860 filed on Oct. 24, 2007, U.S. patent application Ser. No. 12/539,150 filed on Aug. 11, 2009, U.S. patent application Ser. No. 12/877,094 filed on Sep. 7, 2010, U.S. patent application Ser. No. 12/956,031 filed on Nov. 30, 2010, U.S. patent application Ser. No. 12/986,341 filed on Jan. 8, 2011, U.S. patent application Ser. No. 13/216,497 filed on Aug. 24, 2011, U.S. patent application Ser. No. 13/216,521 filed on Aug. 24, 2011, U.S. patent application Ser. No. 13/541,819 filed on Jul. 5, 2012 and U.S. Provisional Application 61/729,653 filed on Nov. 26, 2012. All of these applications are incorporated herein by this reference.

FIELD OF THE INVENTION

This apparatus and the method of use relates to water supplying systems. More particularly, the invention relates to a system whereby water related residential and industrial/commercial facility or building damages associated with water leakage may be reduced or eliminated by selectively disrupting the flow of water into the residence or commercial facility or building when said residence or commercial facility or building is vacated or unsupervised.

BACKGROUND OF THE INVENTION

Losses to residential property and industrial/commercial facilities owner's incident damages caused by broken water pipes are staggering. In part because broken water pipes often go undetected in the absence of the property owner or while the property owner sleeps through the night, water damage from a broken water pipe can be catastrophic. In fact, some insurance agencies report that up to seventy percent of their insurance losses are water related.

Water damages incur billions of dollars of structural, operational, reputational and financial losses each year for residential and commercial property owners. Water damage is the number one source of property claims for owners of high-rise residences, hotels, office buildings, retail establishments and other commercial structures. Leakages can create problems for property owners and managers at any time of year and during any point in a facility's life cycle. What often starts out as a small, undetected leak can quickly spread down through a building, travelling the route of least resistance and at a great distance from its original source, making detection extremely difficult.

It is therefore an object of the present invention to providing a system whereby residential property owner or an industrial/commercial owner may easily protect themselves against catastrophic damages caused by broken water pipes or leaking fixture.

Additionally, it is an object of the present invention to provide such a system that may be operated manually or automatically.

Accordingly, a need remains for a water damage prevention system that has a convenient and means facilitates a means to activate and/or deactivate the water flow from the main water supply with a high percentage of use when a residential home or industrial/commercial facility or building is vacated or unsupervised.

SUMMARY OF THE INVENTION

The present invention is a water damage prevention system that has a residential or industrial/commercial facilities water supply interruption system. The system is comprised of a remotely controllable base station with shut-off/on mechanism that is in a wireless or wired communication with a convenient remotely controller. The remotely controllable base station with shut-off/on mechanism is interposed within a water line from a water main to the living or operating quarters portion of a residential or a industrial/commercial facility or building, such that activation of the base station with shut-off/on valve operates to prevent flow of water from the water main to the living quarters when the residential home or industrial/commercial facility or building is vacated or unsupervised. In this manner, damage to the living quarters or the industrial/commercial facility or building from failure of water pipes running through the living or working quarters is prevented during times that the shut-off mechanism is activated.

To easily and conveniently activate the remotely controllable base station with shut-off/on mechanism, the remote controller preferably comprises a wireless key chain, or a wireless or wired keyboard, or a wireless or wired apparatus that is incorporated within an alarm system or a garage opening system. The remote controller is in wireless or wired communication with water base station with shut-off/on mechanism and the remote controller will have a display means to allow an individual to observe the arrangement of the shut-off/on mechanism. In this manner, occupants or owners may simply press a button on the key chain, or the keyboard, or active a alarm system, or just open and close the garage door of residential home or an industrial/commercial facility or building, causing the flow of water into the living or operating quarters to be interrupted. In a further extension of the present invention, the remote controller may also be provided with a programming timing circuit for automatically operating the base station with shut-off/on mechanism according to a defined schedule. In this embodiment, the timer may automatically cause disruption of water flow into the residential home or industrial/commercial facility or building at times that occupants or workers are normally expected to be absent, vacated, unsupervised. It is anticipated by the Applicants that the disruption of water could be activated during the night or times of resting. It is also anticipated by the Applicants that the base station with shut-off/on mechanism can be provided with an override manual valve which is operable for emergency situations.

The base station with shut-off/on mechanism can be battery operated and utilize re-chargeable batteries that could include an electricity generation means such as a water turbine generation, solar cell, or wind generation means. The base station with shut-off/on mechanism can also be AC or DC powered. It is also preferred that the key chain remote controller is powered by a battery source. The embodiments where the keyboard, alarm system or garage opener can be a combination of battery and AC/DC current power source.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

FIG. 2 is a perspective view of the remote controller comprising a key chain (key fob) apparatus.

FIG. 3 is a perspective view of the remote controller comprising a garage opener that is part of and communicates with the garage opening system.

FIG. 4 is a perspective view of a typical garage opening system used in residential homes.

FIG. 5 is a perspective view of a keyboard/alarm system that incorporates a means to activate and deactivate the base station with shut-off/on mechanism.

FIG. 5a is an enlarged view of the keyboard/alarm system that incorporates a means to activate and deactivate the base station with shut-off/on mechanism.

FIG. 7 is an electrical schematic showing the main power, CPU or microprocessor, the analog or digital display means, the clock circuit, the temperature sensor and the flow sensor.

Corresponding reference characters indicate corresponding parts throughout the several views. The exemplifications set out herein illustrate exemplary embodiments of the invention, and such exemplifications are not to be construed as limiting the scope of the invention in any manner.

DESCRIPTION OF THE PREFERRED EMBODIMENTS

Authentication refers to the technology that ensures that a message, data, control command signal or information that is downloaded or transferred from a one person or device to another declared or intended person or device.

Encryption refers to a privacy technology that prevents anyone but the intended recipient(s) to download, review or read confidential information, signal and/or data.

Integrity refers to technology that ensures that a message, information, control command signal, and/or data do not alter in any way during transit.

Non-repudiation refers to the technology that prevents a sender from denying that a message, data, control command signal or information was sent.

Cellular format technology refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, telephony antenna distributions and/or any combinations thereof, and including the use of satellite, microwave technology, the internet, cell tower, telephony and/or public switched telephone network lines.

A typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufacturers), Apple IPOD Touch, or a television, watch, timepiece or fob watch and other similar apparatus with WIFI and wireless capability, and remote computers and controllers having internet or wireless connectivity.

Figure 1:
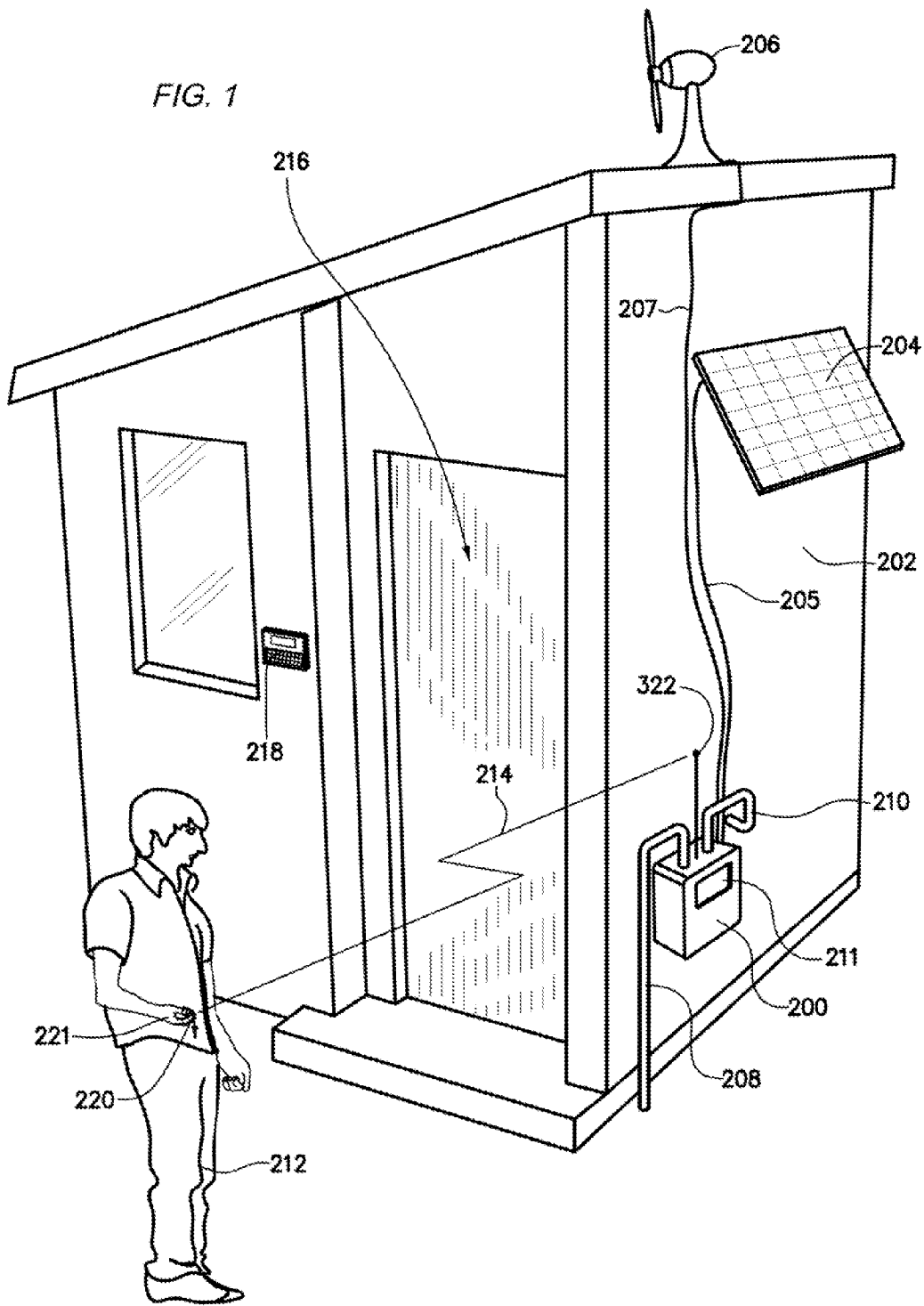
FIG. 1 is a perspective view of the embodiment comprising a home with the base station with shut-off/on mechanism is interposed within the main water supply system and communicating wirelessly with a key chain apparatus held in the hand of an individual. The shut-off/on mechanism is shown having a solar panel and a wind power generator connected to the mechanism to supply additional electrical power.

Referring now to the drawings and particularly to FIG. 1, the water damage prevention system of the present invention generally comprises a remotely controllable base station 200 with water shut-off/on mechanism 310 strategically located between a main supply line 208 from a water main and a household water supply line 210 to a residential building 202. The remotely controllable base station with water shut-off/on mechanism is activated and deactivated by a remote controller 220 to selectively turn on and off the water through the household water supply line 210. In the preferred embodiment of the present invention, the remotely controllable base station 200 with water shut-off/on mechanism 310 is located with respect to the household water supply line 208 such that water flow through the household water supply line 210 to the living quarters of the residential building 202 may be prevented while still allowing water flow to non-residential areas, such as to sprinkler lines. It is also anticipated by the Applicants that the remotely controllable base station 200 with water shut-off/on mechanism 310 can take the place of, and function as, the pressure reduction valve. FIG. 1 also shows the remotely controllable base station 200 with water shut-off/on mechanism 310 connected with a wired means 205 from a solar electrical generation 204 and/or connected with a wired means 207 from a wind electrical generation 206. In this regard, the remotely controllable base station 200 with shut-off/on mechanism 210 can be battery operated and utilize re-chargeable batteries or have typical batteries that are replaceable. The remotely controllable base station 200 with shut-off/on mechanism 310 can also be AC or DC powered. An antenna 322 is shown extending from the remotely controllable base station with water shut-off/on mechanism.

The housing for the remotely controllable base station 200 (with water shut-off/on mechanism 310) can be fabricated from a metallic material such as metallic alloys, steel, galvanized steel, aluminum or any combination thereof. The housing for the remotely controllable base station 200 (with water shut-off/on mechanism 310) can be fabricated can be also fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes.

The joint between the water supply lines 208 and 210 and the remotely controllable base station 200 with water shut-off/on mechanism 310 could be screw and thread fitting, compression fitting, flare fitting, solder, brazed, or sweat joint, adhesive technology and/or use typical plumbing techniques. The joint may be designed to be permanent or removable. The remotely controllable base station 200 can incorporate a freeze design feature (not shown) which, before a freezing condition is encountered, activates a freezing mechanism. This technology is commonly called "frost plugs" or "freeze plugs". This protects the more expensive remotely controllable base station 200 by sacrificing the less expensive and easy to install frost/freeze plug. The optional frost/freeze plug technology is typically used in outside underground pits or poorly heated garages or utility rooms. In some extraordinary freezing situations, the optional frost/freeze plug can be incorporated with a draining mechanism or system (not shown) that allows the water to passively drain from the home or business water pipes or forcefully removes the water from the water pipes with a power system. And it is anticipated that in these extraordinary freezing situations, the draining mechanism or system can also replace the water in the water pipes with air, nitrogen or other gas/liquid that have low freezing points and non-toxic conditions, are can withstand the freezing conditions to minimize damage to the water pipes.

The remotely controllable base station 200 with water shut-off/on mechanism 310 can include a display means 211 for displaying various information, such as if the water is interrupted or allowed to flow into the residence or industrial/commercial facility or building, or to help program the software for scheduled water interruption times (off from 8:30 a.m. until 4:30 p.m. then on, off again at 11:00 p.m. until 5:00 a.m. and then on again). The display means 211 can help program the software to display calendar information, such as the date and current time (12 hr. or 24 hr. format). In this regard, the remotely controllable base station 200 can be programmed using a wire or wireless remote keyboard, alarm system, or use touch screen button technology on the display. The display utilizes one or more illuminating technologies, such as LCD, LED, gas plasma, fluorescence, incandescent, halogen, halide, or other lighting technologies but must able to provide sufficient lighting for observing the data in low light conditions. In addition, the display means and display means housing must be able to sustain capability in outdoor wet and/or hot conditions. The display 211 can have a background light that is used for various purposes, for example, for providing better lighting conditions or changing color e.g. from green to red, to display an alarming condition. An example of a LCD unit that can be used with the present invention is the color graphic 128×128 LCD-00569 marketed by Sparkfun Electronics in Boulder, Colo. It is anticipated by the Applicants that there are other variants and other LCD, LED, gas plasma, fluorescence, incandescent, halogen, halide, or other lighting technologies that can be utilized with the present invention. The display can utilize touch screen technology.

One of the key features of the present invention water damage prevention system is that it has a convenient and easy means which facilitates activation and/or deactivation of the water flow from the main water supply with a high percentage of use when a residential home or industrial/commercial facility or building becomes vacated or unsupervised. If a non-convenient means is utilized, the ratio of use will decrease which compromises the design goal of the present invention. In this regard, shown in FIG. 1 is an individual 212 holding a remote wireless key chain or key fob apparatus 220 in his hand 221. Generally one carries one or more key chains or key fobs for holding keys for entry of one's residence or office, car operation etc. The remote wireless key chain or key fob apparatus 220 communicates wirelessly with the remotely controllable base station 200 with water shut-off/on mechanism 310 with a wireless means 214. Another embodiment of the present invention show a programmable alarm keyboard 218 as part of an overall residential or commercial alarm system for communicating with the remotely controllable base station 200. Another embodiment of the present invention, shown later, includes a specific garage door opener for communicating with the remotely controllable base station 200. Another embodiment of the present invention, also shown later, includes a cell phone, smart phones, or similar apparatus 400 for communicating with the remotely controllable base station 200.

The wireless means 214 can use radio-frequency, Bluetooth, WiFi, Zigbee, optical or other wireless technology for communicating with the remotely controllable water shut-off/on mechanism 200. Examples of Bluetooth modules (using the 2.4 GHz band as WiFi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Applicants recognize that there are numerous wireless protocols that have been developed that, although not specifically listed, could be utilized with the present invention for data transfer purposes.

ISM bands defined by the ITU-R are:

| Frequency range [Hz] | Center frequency [Hz] | Availability |
| --- | --- | --- |
| 6.765-6.795 MHz | 6.780 MHz | Subject to local acceptance |
| 13.553-13.567 MHz | 13.560 MHz | |
| 26.957-27.283 MHz | 27.120 MHz | |
| 40.66-40.70 MHz | 40.68 MHz | |
| 433.05-434.79 MHz | 433.92 MHz | Region 1 only |
| 902-928 MHz | 915 MHz | Region 2 only |
| 2.400-2.500 GHz | 2.450 GHz | |
| 5.725-5.875 GHz | 5.800 GHz | |
| 24-24.25 GHz | 24.125 GHz | |
| 61-61.5 GHz | 61.25 GHz | Subject to local acceptance |
| 122-123 GHz | 122.5 GHz | Subject to local acceptance |
| 244-246 GHz | 245 GHz | Subject to local acceptance |

While currently the 430 MHz, 900 MHz and 2.4 GHz and 5 GHz frequencies are commonly used in the US, it is anticipated by the Applicants that the other frequencies could be used for signal and data transfers.

Another protocol known as CAN or CAN-bus (ISO 11898-1) was originally designed for automotive applications, but is now used in industrial applications. CAN is another type of network that can be used to transfer water parameter data. Devices that are connected by a CAN network are typically sensors, actuators and control devices. A CAN message never reaches these devices directly, but instead a host-processor and a CAN Controller is used between these devices and the bus.

Now referring to FIG. 2 which is a perspective view of the remote controller comprising a key chain or key fob apparatus 220. The remote controller key chain or key fob apparatus 220 is of a convenient size for placing in a pocket or purse and has a chain connection 224 for attached one or more keys 222. The main housing 226 of the key chain or key fob apparatus 220 has a pair of buttons. One button 228 activates the base station 200 with water shut-off/on mechanism 310 through wireless communication 114 interrupting or activates the water supply to the residence 216 or industrial/commercial building. The other button 230 deactivates the remotely controllable base station water 200 with shut-off/on mechanism 310 to turn on the water supply. It is anticipated by the Applicants that one button can be utilized to activate and deactivate means (toggle on and off). An indicator LED, LCD or other light (or display) can show the state of the shut-off/on mechanism, e.g. green for open (deactivated) and red for closed (activated). In addition, an auditory alarm can be incorporated into the present invention for the purposes of relating the state of the shut-off/on mechanism e.g. one beep for on and two beeps for off. The remote controller key chain or key fob apparatus 220 also has, but is not shown, an internal replaceable or rechargeable battery with an operable battery door, electrical circuitry, and transceiver with internal antenna. The wireless communication means could use utilize encryption, authentic, integrity and/or non-repudiate techniques to provide a secure signal (with pairing technology) so that the activation or deactivation occurs with integrity and accuracy such that that is not conflict with other wireless signals or technology in the immediate area. Also, with residences and industrial/commercial buildings in close proximity, it is essential that the signal only activates or deactivates the intended and specific remotely controllable base station 200 with water shut-off/on mechanism 310. Such technology will ensure that the signal is secure such that unintended or intended signals do not send control messages to non-desired or non-owned base stations 200 with water shut-off/on mechanisms 310.

FIG. 3 shows a garage door opener 240 that is part of an overall garage door 250 opening system 252 with chain or cable driving mechanism 254. The garage door opener is typical in size and function with a button 244 for opening and closing the garage door. The difference is that the garage door opener has additional buttons. One button 228 activates the base station water 200 with shut-off/on mechanism 310 through wireless communication 114, interrupting the water supply to the residence 216 or industrial/commercial building. The other button 230 deactivates the remotely controllable base station 200 with water shut-off/on mechanism 310 to turn on the water supply. It is anticipated by the Applicants that one button can be utilized to activate and deactivate means (toggle on and off). An indicator LED, LCD or other light (or display) can show the state of the shut-off/on mechanism, e.g. green for open and red for closed. In addition, an auditory alarm can be incorporated into the present invention for the purposes of relating the state of the shut-off/on mechanism. It is anticipated that new garage door opening systems 252 can incorporate the components necessary to communicate wirelessly or hard wired to communicate with the remotely controllable base station 200 with water shut-off/on mechanism 310 of the water damage prevention system. In previously installed garage door opening systems, a specifically designed electrical module can be electrically attached to the previously install garage door opening system that works with a new garage door opener 240. The wireless communication means could use utilize encryption, authentic, integrity and/or non-repudiate techniques to provide a secure signal (with pairing technology) so that the activation or deactivation occurs with integrity and accuracy such that that is not conflict with other wireless signals or technology in the immediate area. Also, with residences and industrial/commercial buildings in close proximity, it is essential that the signal only activates or deactivates the intended and specific remotely controllable base station 200 with water shut-off/on mechanism 310. Such technology will ensure that the signal is secure such that unintended or intended signals do not send control messages to non-desired or non-owned base stations 200 with water shut-off/on mechanisms 310.

FIG. 4 is a perspective view of a typical garage opening system. The typical garage door opening system has a distal means to attached to the garage door 250 the engages a chain, belt or screw drive mechanism 254 that is operated by a proximal housing 252 that contains an electric motor, lights, timing circuits, and wireless communication technology. Near the garage door shown is an alarm keypad 218 as discussed in more detail in the paragraph below.

FIG. 5a shows an alarm keyboard 218 that is part of an overall alarm system, whereas FIG. 5b show an enlarged view of the alarm keyboard. One or more alarm keyboards 218 are typically located within the living quarters of the residential or commercial building adjacent an entry doorway. In this embodiment, specific coding of the alarm system will be necessary. By pushing specific keys on the keyboard (hard or soft keys) 256 will be utilized to not only input alarm codes, but also to activate and deactivate the remotely controllable base station 200 with water shut-off/on means 310. In one operation, when one arms the alarm system, after the delay, the alarm system will become activated and the alarm system can communicate wirelessly or by hard wired with the remotely controllable base station 200 with water shut-off/on mechanism 310. In another operation, a specific step, key code or question will be necessary in the alarm programming to include an intended response before the corresponding wireless or hard wired signal is sent to the remotely controllable base station 200 with water shut-off/on mechanism 310. This may be a necessary step as some individuals use the alarm system (peripheral surveillance) when they are in their homes for additional protection. It is anticipated that new alarm systems can incorporate the software instruction and components necessary to communicate wirelessly or hard wired to communicate with the remotely controllable base station 200 with water shut-off/on mechanism 310 of the water damage prevention system. In previously installed alarm systems, a specifically designed electrical module may be electrically attached to the previously install alarm system. The wireless communication means will preferably utilize encryption, authentic, integrity and/or non-repudiate techniques to provide a secure signal so that the activation or deactivation occurs with integrity and accuracy such that that is not conflict with other wireless signals or technology in the immediate area. Also, with residences and industrial/commercial buildings in close proximity, it is essential that the signal only activates or deactivates the intended and specific base station with water shut-off/on mechanism. Such technology will ensure that the signal is secure such that unintended or intended signals do not send control messages to non-desired or non-owned base stations 200 with water shut-off/on mechanisms 310. It is anticipated by the Applicant that in hotels and motels situations, the alarm system or key entry or electrical door card placed within an electrical receptacle can activate the remote controllable base station to turn off the water when the hotel/motel room is unoccupied (and activates remote controllable base station to the turns on the water when the hotel/motel room is occupied.

An option to be utilized with the present invention is that the remotely controllable base station 200 with water shut-off/on mechanism 310 can include programming instructions with a timing circuit to a user defined time schedule. In this manner, the residential occupant or industrial/commercial owner may simply establish that the water supply will be blocked during working hours and/or during sleeping hours. The scheduling could be a daily, weekly, monthly or annual. The programming of the timing schedule could be input into the CPU of the base station electrical circuitry via various methods, e.g. wireless or wired communication with a computer with appropriate software, using the remote controllers, or using touch screen technology on the display means, etc.

Figure 6:
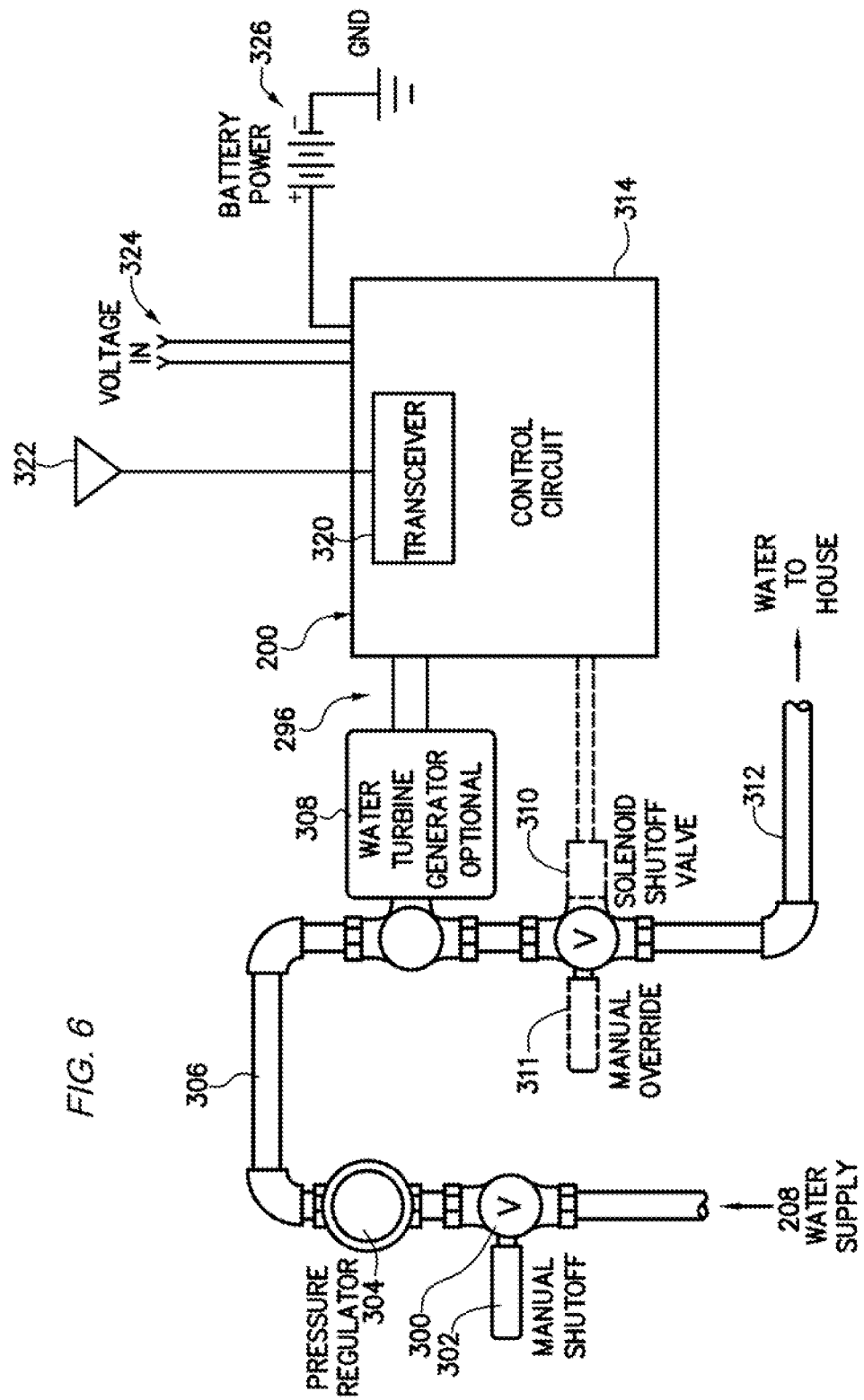
FIG. 6 is a schematic more detailed view of the base station with water shut-off/on mechanism and water supply plumbing with optional water turbine generator and its location within the water supply line.
Figure 6A:
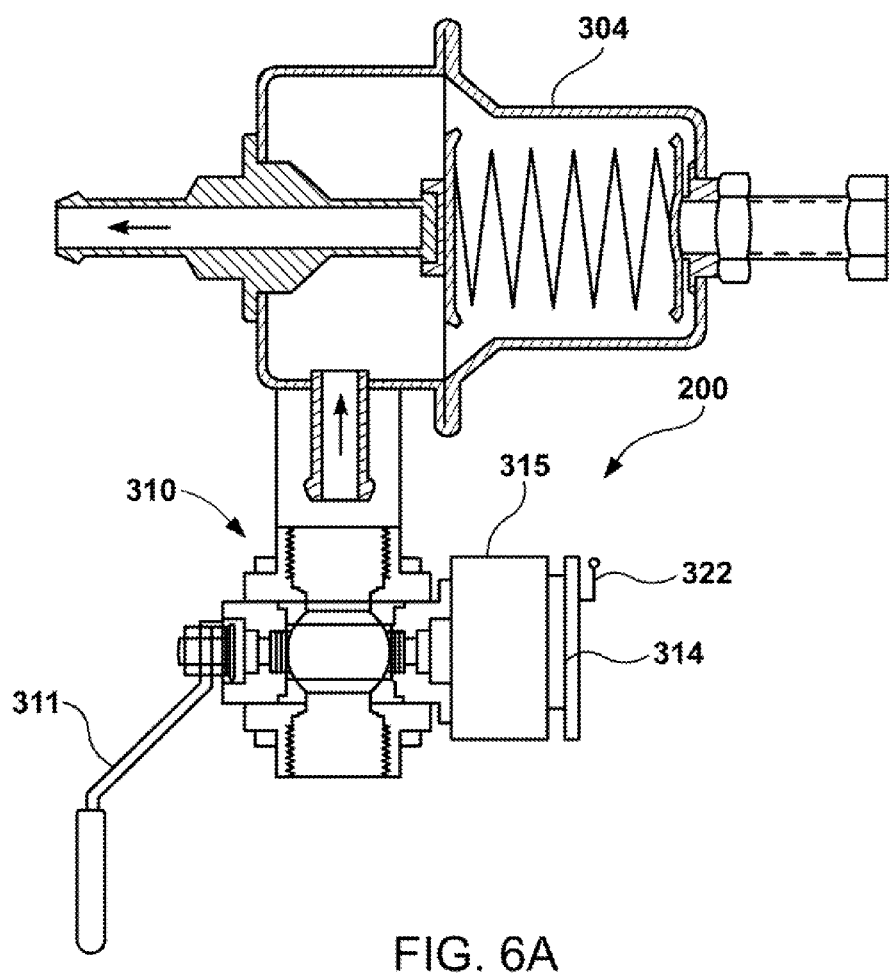

Now referring to FIG. 6, shown is a perspective more detailed view of the remotely controllable base station 200 with water shut-off/on mechanism 310 and water supply plumbing, and with optional water turbine generator 308 that is located within the water supply line. The water supply line from the water main 208 first engages a manual shut off valve 302. The manual shut off valve can be a ball valve, gate value type, piston valve, or other known technology. Further along the water supply line is a pressure regulator 304 with a connecting pipe 306 to the present invention water damage prevention system remotely controllable base station 200 with water shut-off/on mechanism 310. Also shown is an optional water turbine generator 308 that could be utilized to produce electrical energy for recharging the battery source 326. The water shut-off/on mechanism 310 (shown as solenoid shutoff valve) can be a ball valve, gate value type, piston valve, or other known technology with electronic activation. A mechanical lever 311 can be incorporated on the water shut-off/on mechanism (solenoid shutoff valve) to allow the modification of the mechanism to open the water flow in emergency and necessary situations. The remotely controllable base station 200 has a transceiver 320 that includes an antenna 322 which can be external or internal. The control circuit for the remotely controllable base station 200, shown in more detail in FIG. 7, includes programmable CPU, a power source using either a battery (rechargeable) 326 or typical AC or DC supply 324, and electrical circuitry, wireless or hard wired components, and optional sensors and associated circuitry. Also shown is a battery voltage 326 which would electronically engage the optional solar cell 302 or wind generator 206 to provide additional electrical energy. Exiting from the remotely controllable base station 200 with water shut-off/on mechanism 310 is the main water supply 312 to the home (or commercial facility or building). It is anticipated by the Applicants that the water shut-off/on mechanism 311 (solenoid or ball valve shutoff valve), and if used, the optional water turbine generator 308, could be incorporated within the remotely controllable base station 200 as a single unit.

It is also anticipated that the remotely controllable base station 200 with water shut-off/on valve 310 could replace, and function as, the main water meter.

Multi-jet meters measure water velocity converting the velocity into volume of use. They use an impeller which rotates on a horizontal plane that is driven by several "jets" of water flowing through holes evenly spaced around the entire circumference of the impeller. Strong points of multi-jet meters are that they can be smaller than PD meters of the same flow rate, and therefore sometimes less expensive and lighter weight reducing manufacturing and shipping costs. Multi-jets are very accurate at low flow rates, and have low head loss (pressure loss) at high rate compared to PD meters. Since the impeller moves freely in the chamber on a spindle with a bearing, it can also pass sand, rust particles, minerals, or small particulate matter without damage or clogging. In this embodiment, a Multi-jet meter can incorporate a stop mechanism such as a solenoid activated mechanism (not shown) that impedes the impeller from rotating and restricts the flow of water. Such activated mechanism can be wirelessly (or wired) controlled remotely as described herein.

Positive Displacement Meter or "PD" meters measure water volume with an oscillating piston or a nutating disc. PD meter sizes are typically ⅝" to 2". The disc or piston has very high tolerances between it and the chamber. Water must push or "displace" the measuring element to go through the meter. Because of high tolerances, new and well maintained PD meters can be very accurate. PD meters can have more pressure loss through the meter and be somewhat noisier in indoor settings at high flow rates than multi-jet meters. PD meters cannot be recalibrated, but must be rebuilt with new measuring chambers when they wear out. Because water cannot pass through the meter without moving the measuring element, they are good candidate for incorporating a stop mechanism such as a solenoid activated mechanism or pin (not shown) that impedes the oscillating piston or nutating disc from operating and restricts the flow of water. Such activated mechanism can be wirelessly (or wired) controlled remotely as described herein.

Single jet meters are another standard meter specification less common in the U.S. Single Jets are sometimes called "paddle wheel" meters. Single jets have an off center inlet and outlet and a jet of water flows on only one side of an impeller, working similar to the water wheel at an old mill or the paddle wheel on a riverboat. Because water cannot pass through the meter without moving the measuring element, they may be a good candidate for incorporating a stop mechanism such as a solenoid activated mechanism or pin (not shown) that impedes the "paddle wheel" from rotating and restricting the flow of water. Such activated mechanism can be wirelessly (or wired) controlled remotely as described herein.

Shown in FIG. 7 is a more detailed description of the electrical circuitry. A timing clock integrated circuit 272 with data transfer means 273 for communicating with the CPU or microprocessor 266 and having a power line 274 and ground line 276. The timing sensor can communicate with the CPU or microprocessor to display such information such as the time of day and current date and/or the totally duration that the water supply has been on before it was turned off, or for providing scheduling procedures. Various mechanical and magnetic switches can be utilized to communicate a signal to the CPU or microprocessor 84 that water supply has been turned off and on.

The CPU or microprocessor 266 that processes the control signals supplied by the remote controllers 218, 220 and 244, the timing circuitry 272, and the optional temperature 286 and flow sensors 280 uses internal instructions to control the information projected on the remote controllers 218, 220 and 244 and optional display 211. The microprocessor can include an EEPROM or any type of memory section that allows for specific programming to be incorporated as processing instructions (e.g. scheduling). Furthermore, the microprocessor may have the capability to convert analog signals into digital information for decoding and processing. An example of a CPU or microprocessor 266 that could be used for the CPU or microprocessor is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word instruction set. It also has five 10-bit Analog-to-Digital Inputs that can provide the means for converting the information obtained from the optional temperature sensor 286 and flow sensor 280 from analog format into a digitized form for processing by the instruction sets of the CPU or microprocessor 266. Another example of a microprocessor that could be used for the CPU or microprocessor 266 is the MSP430 family of processors from Texas Instruments in Dallas, Tex. There are hundreds of variants but for an example, the MSP430F436IPN (80 pin package) or MSP430F436IPZ (100 pin package) could be utilized in the present invention. There are many other variants or other microprocessors, whether commercially marketed or privately fabricated, that can be used with the present invention.

The CPU will could also have the capability to record compliance use data, e.g. time and date stamp for recording each water system shut off or turn on occurrence. The compliance use data can be used by insurance companies, municipality agencies, third parties, or the owner of a residence or company, to determine if the individuals are utilizing the water damage prevention technology or if a during a particular leak damage event that the water prevention technology was utilized. The compliance use data can be downloaded by a USB or other transfer port or transferred wirelessly (or by PSTN) to a support type device, the remote managing operations, or the insurance company, municipality agency or a third party. The use of the data obtained can be presented in various formats or defined formats specified by owner, insurance companies, municipality agencies or third party.

The wireless communication means 214 communicates with the programmable CPU 266 through data lines 277. The programmable CPU or microprocessor 266 receives electrical energy through power line 268 and a ground line 270. The optional display 211 communicates with the CPU or microprocessor 266 with display control and data lines 264. If utilized, the display 211 receives electrical energy through power line 260 and a ground line 262.

An optional temperature sensor 286 can be incorporated in the remotely controllable base station 200 to monitor water temperature. The temperature sensor 286 can be used to sense freezing conditions which might disrupt proper operation of the system, can be utilized to provide more accuracy of other components, such as the flow sensor, or active a freeze plug mechanism. In some extraordinary freezing situations, the optional temperature sensor 286 can be incorporated with a draining mechanism or system (not shown) that allows the water to passively drain from the home or business water pipes or forcefully removes the water from the water pipes with a power system. And it is anticipated that in these extraordinary freezing situations, the draining mechanism or system can also replace the water in the water pipes with air, nitrogen or other gas/liquid that have low freezing points and non-toxic conditions, are can withstand the freezing conditions to minimize damage to the water pipes.

The optional temperature sensor 286 receives electrical energy through power line 292 and a ground line 294. The optional temperature sensor 286 can function to automatically shut off the water when the temperature approaches freezing or transfer temperature data wirelessly to warn of the freezing conditions and allow an individual to make the decision to send wireless instructions from the keychain or key fob apparatus 220, garage door opener 240, alarm system 218, or cell phone, smart phone or similar apparatus 400.

In addition, in another embodiment the remotely controllable base station 200 could communicate with optional highly sensitive flow sensors with transceivers that are designed to determine if the flow is occurring through a particular water fixture is as slow as, for example, 25-50 ml per minute. The highly sensitive flow sensors with transceivers can be programmed to periodically detect slow flow or no flow conditions at particular time intervals, such as, for example, every 10 to 45 seconds. Alternately the water parameter data can be recorded and stored at individual high flow sensor for subsequent transmission as a stream of data points or a data packet. In this regard the recorded data can be transmitted wirelessly to the remotely controllable base station 200 at longer programmable time intervals, such as, for example, every 24 hours. The highly sensitive flow sensor with transceivers are designed as wireless flow sensors and designed to have very low electrical power usage. Power consumption for each highly sensitive water flow sensor with transceivers are designed to be extremely low, for example, about 100-200 micro-amp hours per day. Power can be supplied by batteries, or alternatively, can be connected to the 120/240 volt electrical system. The highly sensitive water flow sensors with transceivers can have an extended battery life by utilizing the interval wireless communications or transmissions and with a long lasting battery pack, such as, for example, the Tadiran series of batteries manufactured by Tadiran U.S. Battery in Lake Success, N.Y. A sealed door means is utilized to allow battery replacement. In addition, the batteries can be recharging type and accessed with an electrical coupler accessed from the outside of the highly sensitive flow sensors with transceivers.

At the water use and water energy use monitoring display apparatus/base station 10, 126, received data can be stored and analyzed to determine whether any water fixture in the facility is leaking by analyzing a means that differentiates between normal flow conditions and a slow flow condition When or if leakage condition is indicated, an alert can be generated on the various displays associated with the remotely controllable base station 200 and/or initiate a call, using wireless network 44, can be made to the home or office owner/operator or to the municipality or governing agency (or an insurance company) so that maintenance personnel can be dispatched to turn-off the water supply at the offending residence or office or fix the leaking unit. The data and/or results of analysis conducted at the remotely controllable base station 200 can be transmitted to a remote central monitoring computer service via satellite, microwave technology, the Internet, telephone lines, and the like. At the off-site location, additional analysis and/or monitoring can be accomplished.

The highly sensitive flow sensors with transceivers, are designed to have coordination, between the remotely controllable base station 200 by using software instructions for timing, network position, and polling operations. For example, the base station 200 can first send a broadcast message to, for example, one or more highly sensitive flow sensors with transceivers The broadcast message can instruct the highly sensitive flow sensors with transceivers to, for example, synchronize themselves in the system, set their clocks, and identify their wireless path to the remotely controllable base station 200. After receiving the broadcast message, the remotely controllable base station 200 can send an acknowledgement back to the base station 200 revealing their location in the system.

The remotely controllable base station 200 can also communicate with the highly sensitive flow sensors with transceivers to include software instructions for programming time intervals for water parameter data transmission.

Coordination of data packet transmissions from the highly sensitive flow sensors can be scheduled. The remotely controllable base station 200 can run a master schedule for querying each flow sensor. For example, remotely controllable base station 200 can transmit a message to a specific coordinator node 18 and that coordinator node can then sequentially request data from each of its flow sensors. This systematic process can reduce data packet collision on the network and can make the remotely controllable base station 200 immediately aware of any flow sensor that might be having trouble transmitting its data packet. The remotely controllable base station 200 can transmit an acknowledgement to each highly sensitive flow sensors after successfully processing a data packet.

The software in the remotely controllable base station 200 to perceive water flow characteristics in the facility for a given unit of time, such as, for example, a day, for every unit in the facility. The software should be designed to identify numerous conditions, such as, for example, faulty toilet valves, periodic and irregular water flow for example toilets, faucets, and a slow constant water flow, a characteristic of a leakage condition.

Figure 8:
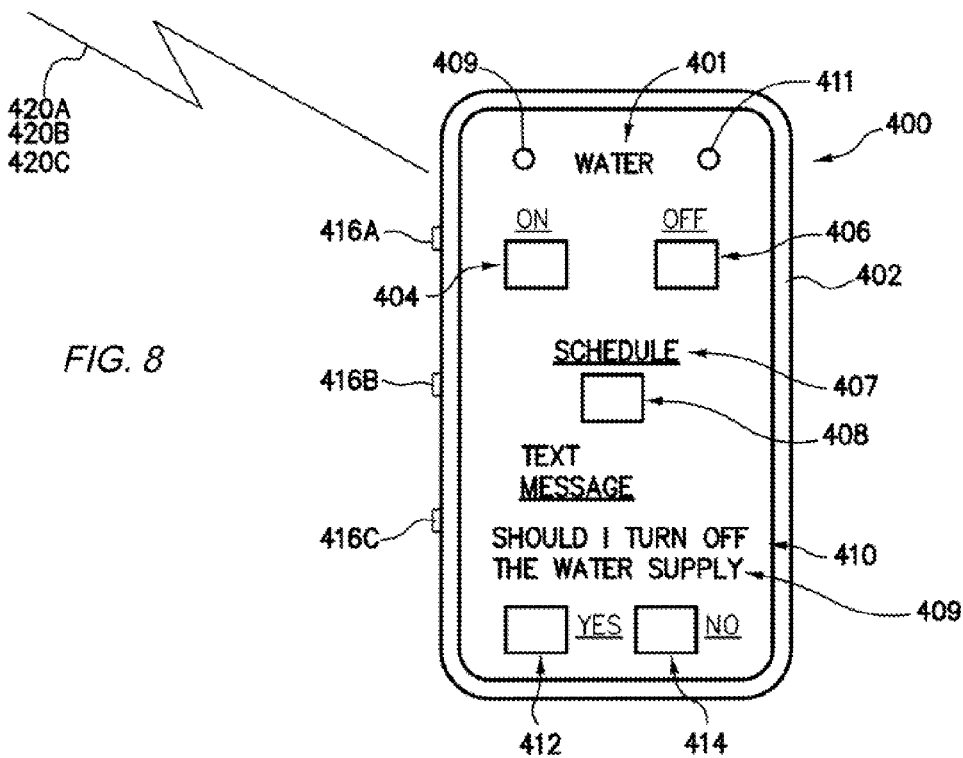
FIG. 8 is a perspective view of a typical cell phone, smart phone or similar apparatus having an application programmed to display soft buttons or control activators to wirelessly communicate with the base station and shut-off mechanism.

Referring to FIG. 8, which shows a perspective view of a typical cell phone, smart phones, or similar apparatus 400 having an application 402, commonly known as an "APP", programmed to display soft buttons or use control activators on a cell phone, smart phone, or similar apparatus 400, designed to wirelessly communicate or send signals to and from the remotely controllable base station 200 with water shut-off/on mechanism 310. It is also anticipated that the apparatus 400 could be an Apple IPAD, HP, Samsung, LG, or other manufacturer's tablet and that the application 402 that would function as described below. Furthermore, apparatus 400 could be a remote computer or television that is connected to the internet or has wireless capability. Shown in FIG. 8 is an example of an application 402 which will typically display soft buttons for controlling water on 404 and water off 406 by sending wireless instructions to the remotely controllable base station 200. It is anticipated by the Applicant that other configuration of application displays for remotely communicating with a remotely controllable base station 200. The application 402 can also have a soft schedule button 408 which sequentially adds displays for entering a predetermined schedule for turning on and off the water at the remotely controllable base station 200. The predetermined schedule can be sent to the remotely controllable base station 200 for continuous sequencing operations on a: daily, weekly, monthly or yearly basis. The predetermined schedule can be stored in a memory module at the remotely controllable base station 200.

An option of the application 402 is shown as a decisional text message 410 inquiring if the individual would like the water turned off sent to the cell phone, smart phone or similar apparatus 400. The cell phone, smart phone or similar apparatus 400 would preferably have incorporated GPS technology that can determine the location of the cell phone, smart phone or similar apparatus, and know or saved the home or remotely controllable base station 200 location. Triangulation techniques between cell towers can also be used if the cell phone, smart phone or similar apparatus 400 does not have GPS capability. The application 402 could or will have a routine that can program the distance from the remotely controllable base station 200 that an individual wants to be provided a notice of the decisional text message. If the water is not turned off when the individual leaves the residence or business, and the cell phone, smart phone or similar apparatus 400 has been programmed for a set distance from the base station e.g. ¼ mile, then the decisional text message 410, for example. "Should I turn off the water supply", will be sent to the cell phone, smart phone or similar apparatus 400. The rational for the decisional text message is that, for the present invention to function as a water damage prevention system, substantial compliance with routine turning off the water when a home or business in unoccupied is necessary. The decisional text message 410 provides the individual a soft button "yes" 412 to turn off the water at the remotely controllable base station 200 or "no" 414 and leave the base station 200 with the water control valve on. Hard button activators 416a, 416b and 416c can also be used to communicate with the remotely controllable base station 200 for cell phones, smart phones or a similar apparatus that a limited display screens or no touch screen capability. For example, hard button 416a can communication with the remotely controllable base station 200 to turn the water system on, hard button 416b can communication with the remotely controllable base station 200 to turn the water system off, and hard button 416c can communication with the base station to open a schedule page.

Another optional decisional text message 410 can sent to the cell phone, smart phone or similar apparatus 400 if one of the optional highly sensitive flow sensors detects a leaking condition. The text message could specify "Leak found in kitchen area, should I turn of the water supply". The decisional text message 410 provides the individual a soft button "yes" 412 to turn off the water at the remotely controllable base station 200 or "no" 414 and leave the remotely controllable base station 200 with the water control valve on. Hard button activators 416a, 416b and 416c can also be used to communicate with the base station for cell phones, smart phones or a similar apparatus that a limited display screens or no touch screen capability. This optional leak detection message could also be sent the insurance or municipality agency monitoring station by PSTN or wireless means to notify of the leakage condition. It is also anticipated by the Applicant that the leak detection message could also be transferred to the supplying municipality to inform them of the leak such that the municipality can take action to repair the leak condition.

Also shown in FIG. 8 are one or more visual signals 409, 411 (e.g. LED or LCD) lights that are turned on (and off after a period of time) to communicate to an individual that the remotely controllable base station 200 has completed the programmed activity. For example only, 409 could be a red LED light that illuminates when the water system is turned off and 411 could be a green LED light that illuminates when the water system is turned on. It is anticipated by the Applicant that verbal signal (verbal "water off" or verbal "water on" or simply a playing certain ringtones) can also be used to communicate that the programmed activity has been completed.

Typical cell phones, smart phones, and similar apparatuses 400 may have one or more means of communication that can be established with a particular remotely controllable base station 200 for wireless communication. The use of Bluetooth wireless technology 420a is commonly a feature found on many cells phones, smart phones and similar apparatus. Such Bluetooth wireless communication 420a can be a means to communicate with the remotely controllable base station 200 with water shut-off/on mechanism 310 to turn the water on or off or receive decisional text messages 410. Zigbee is another wireless technology that can be used. However, most current cell phones, smart phones or similar apparatus 400 do not possess Zigbee wireless capability.

The use of WIFI (IEEE 802.11 family of wireless local area network) wireless technology 420b is commonly a feature found on many cells phones, smart phones and similar apparatus 400. Such WIFI wireless communication 420b can be a means to communicate remotely with the remotely controllable base station 200 with water shut-off/on mechanism 310 to turn the water on or off or receive text messages. The remotely controllable base station 200 can have the capability to receive and transfer wireless signals and decisional text messages 410 using WIFI technology directly to the remotely controllable base station 200. Alternately, the WIFI communication 420b will communicate with a wireless router that has a HTML based interface and configuration page graphic user interface. Remote access from the cell phone, smart phone or similar apparatus 400 could use a short message service (SMS) interface and/or voice of Internet Protocol (VOIP) which communicates with the wireless router. This WIFI technology will access the internet and have the ability to recognize the cell phone, smart phone or similar apparatus 400 phone number for remote capability using SMS interface. A digit numbers security can be used to maintain restricted integrity. Wireless Transmitters and Receivers can be used for WIFI communication 420*b* to the remotely controllable base station 200 for individuals lacking internet capability at their residence.

The use of cellular wireless technology 420*c* is a primary feature of cells phones, smart phones and similar apparatus. Such cellular wireless communication 420*c* can be a means to communicate with the remotely controllable base station 200 with water shut-off/on mechanism 310 to turn the water on or off or to receive text messages.

The application 402 will have to interface with the Bluetooth 420*a*, WIFI 420*b*, or cellular 420*c* wireless communication means, and send instructions to a specific "paired" remotely controllable base station 200. Various pairing methods between the remotely controllable base station 200 and the cell phone, smart phone or similar apparatus 400 are contemplated to be necessary to ensure that proper communication is established between a single and unique remotely controllable base station 200 in addition to one or more unique cell phone, smart phone or similar apparatus 400. A Quick Response Code (QR code) unit address located on remotely controllable base station 200 can communicate with a cell phone, smart phone or similar apparatus 400 having a camera to read QR and establish link to the remotely controllable base station 200. Standard barcodes could would to pair and establish a link between the remotely controllable base station 200 and the cell phone, smart phone or similar apparatus 400. Near field link and RFID chip technology can also be used to facilitate pairing and establish a link between the remotely controllable base station 200 and the cell phone, smart phone or similar apparatus 400. Currently bar code readers are applications that can be downloaded for a particular cell phone, smart phone or similar apparatus operation system. Near field links are only recently becoming available on Samsung smart phones, but this technology may be expanded to many, if not all, cell phones, smart phones or similar apparatus.

In operation, an individual who wants to turn off the water system would touch the off the soft button 406 or reply to the text message to turn off the water system 410 "yes" soft button 412, or push the hard button 416*b* on the a cell phone, smart phone or similar apparatus 400 which will communication with the remotely controllable base station 200 via the internet, wireless technology (e.g. Bluetooth, Zigbee), and/or cellular format technology and then the paired remotely controllable base station 200 would turn off the water system off and then when completed (specified by switches and/or a flow sensor) will send a returned communication signal to the a cell phone, smart phone or similar apparatus 400 and turn on signal (audio or visual) message 409 that the water system is off. Comparable, an individual who wants to turn on the water system would touch the "on" the soft button 404 or reply to the text message to turn off the water system 410 "no" soft button 412, or push the hard button 416*a* on the a cell phone, smart phone or similar apparatus 400 which will communication with the remotely controllable base station 200 via the internet, wireless technology (e.g. Bluetooth, Zigbee), and/or cellular format technology and then the paired remotely controllable base station 200 would turn off the water system off and then when completed (specified by switches and/or a flow sensor) will send a returned communication signal to the a cell phone, smart phone or similar apparatus 400 and turn on signal (audio or visual) message 409 that the water system is off.

Figure 9:
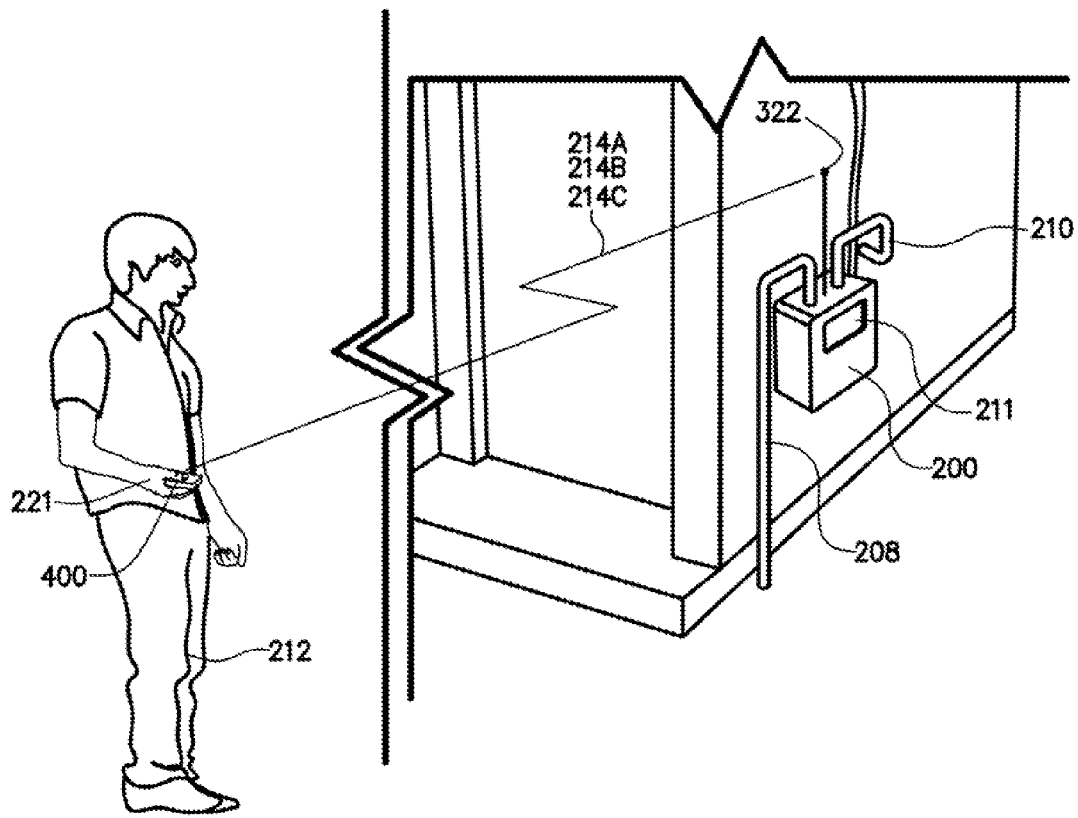
FIG. 9 is a perspective view of the embodiment comprising a home with the base station with shut-off/on mechanism is interposed within the main water supply system and communicating wirelessly with a cell phone, smart phone or similar apparatus held in the hand of an individual.

Now referring to FIG. 9 which shows a perspective view of the embodiment comprising a home with the remotely controllable base station 200 with shut-off/on mechanism interposed between the main water supply system 208 and the first distribution line for the home or company 210 and communicating wirelessly with a cell phone, smart phone or similar apparatus 400 held in the hand 221 of an individual 212. The cell phone, smart phone or similar apparatus 400 communicates with the remotely controllable base station 200 with water shut-off/on mechanism 310 using Bluetooth wireless technology communication 420*a*, WIFI wireless communication 420*b*, or cellular wireless communication 420*c*.

An optional flow sensor 280 can be incorporated in the remotely controllable base station 200 to monitor water flow. The flow sensor 280 can be used to send the signal through the CPU/microprocessor to the remote controllers 218, 220 and 244 for confirmation that the water flow has been interrupted. While the position of the shut-off/on mechanism valve 310 can also be used for this purpose, for additional confirmation that the water flow has been interrupted. The optional flow sensor 280 receives electrical energy through power line 282 and a ground line 284.

Figure 10:
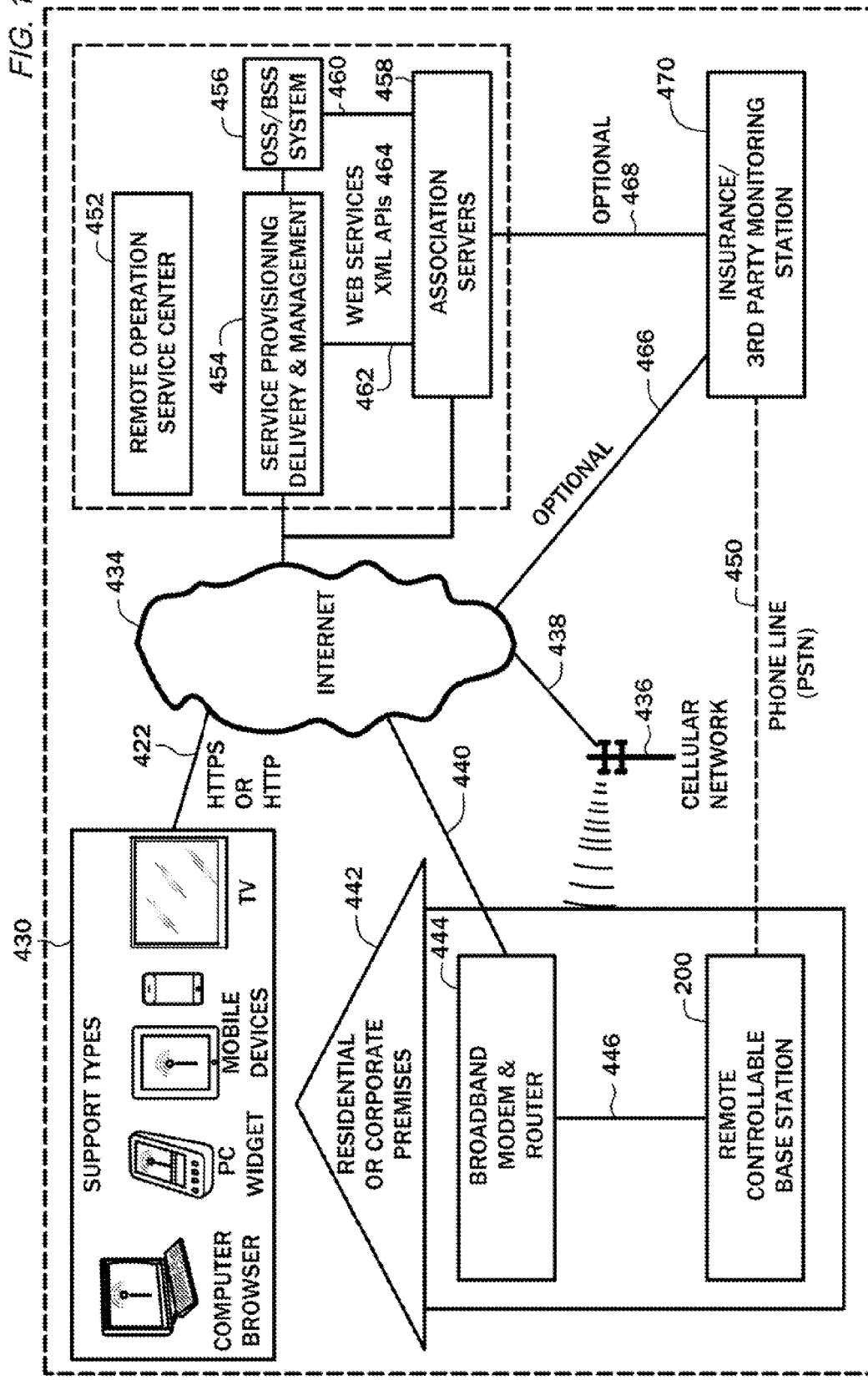
FIG. 10 is a block diagram of the more integrated system.

FIG. 10 is a block diagram of the present invention, under another embodiment that provides additional integrity technology for the transfer of data. At a home or business customer premises, a broadband modem (e.g. cable, DSL, satellite or other service) and router 444 connects and manages the remotely controllable base station 200. The broadband modem and router 444 communicate with the remotely controllable base station 200 or insurance company, municipality agencies and/or third party station 470 located in the service provider's data center (or hosted by an insurance, municipality agencies and/or third party monitoring, and data center) with the communications takes place via a communication network 434, 436 (e.g., cellular network, internet, etc.). These Remote Operation Service Centers 452 manage the system operations necessary to deliver the integrity of the system service described herein. The combination of the broadband modem/router 444 and the Remote Operational Service Center 452 enable a wide variety of support type devices 430 (e.g., PCs, mobile phones and PDAs, computers, televisions) to communicate with the base station 200 allows users to remotely control the residential or commercial water supply.

The Remote Operation Service Center 452 is managed by a service provider via the browser-based Service Provisioning Delivery and Maintenance applications 454 that are provided within the Remote Operational Service Center 452. Or, if preferred, the service can be more tightly integrated securely with the existing OSS/BSS 456 and service delivery systems 462 via the Web Services-based XML APIs 464 to Association Servers 458.

The integrated insurance, municipality agency or other third party service 470 can also coordinate the monitoring of compliance data use and/or perform the services of the Remote Operational Service Centers 452 and the optional communication with the internet 434.

In addition to HTTP or HTTPS communications 422, the broadband modem and router 444 and Remote Operation Service Center 452 can support the use of a cellular network 436 (both GPRS, GSM and CDMA options are available) as another means to provide the primary broadband connection 438 to the internet 434. However, currently available broadband modems and routers are unable to communicate view 436 as the required electronics are not incorporated into the electrical circuitry. In spite of this, broadband routers such as those currently seen in homes or companies are enabled to communicate with the internet via a DSL line (over the switch telephone network (PTSN) or cable modem. One viable option is to build a cellular network circuitry into the broadband router or remote base station. Alternately, a smart phone can be used as a "hotspot". When configured as such, the smart phone "hotspot" turns instantly into a broadband router to which the remotely controllable base station 200, PC, or television 430 can communicate with the internet.

Figure 11:
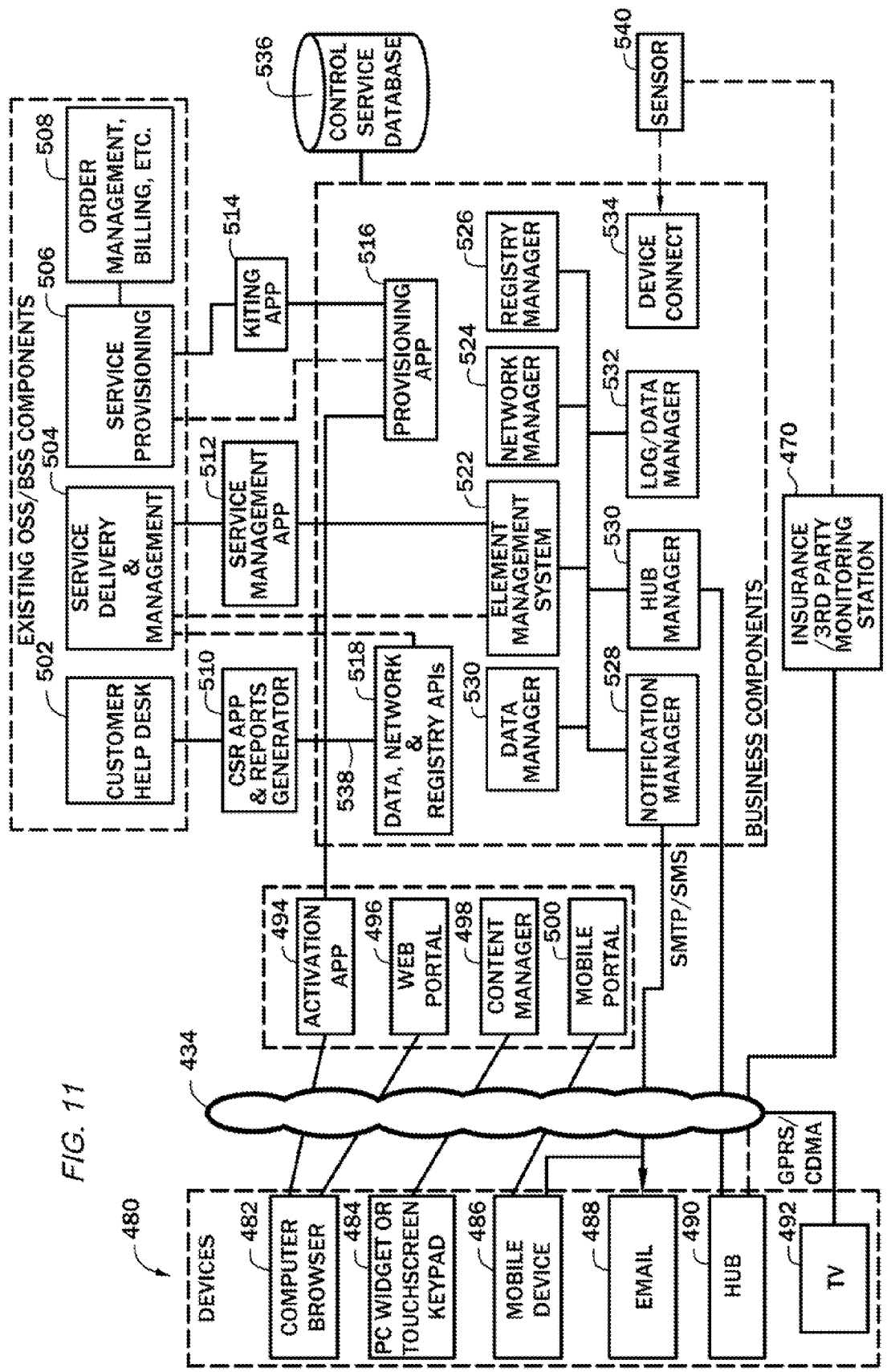
FIG. 11 is a block diagram of components of the more integrated system

FIG. 11 is a block diagram of components of the present invention, under an embodiment, showing a more detailed description of the components. The diverse collection of apparatus/devices 480 range from computer browsers 482, PCs, PC applications or programs 484 or touch screen keypads, mobile devices 486, email 488, hub 490 or wireless (GPRS, GSM or CDMA) or internet connected televisions 492.

The apparatus/devices 480 accessing a Web Portal application 494 through the internet 434, performs an end-user configuration and customization of the integrated service. Additionally device management is capable of performed by this portal application. A mobile device 486 (e.g., PDA, mobile phone, etc.) accessing the integrated system Mobile Portal 500. PC or browser-based "widget" devices 484 that present integrated security system service content, as well as other third-party content, in simple, targeted ways.

There are numerous types of server components of the Remote Operation Data Service Center 452. Business Components which manage information about the controlling/monitoring devices, using Web 2.0, and XML APIs (see FIG. 10). Within the OSS/BSS Components are the Customer Help Desk 502 which provides information about remote devices and base station installment instructions and operation and technology questions. The Service Delivery and Management Application 504 enables operators to administer the service (these components also access the Business Components via the XML APIs, and also via published SNMP MIBs). Service provisioning 506 can be used to include a $3^{rd}$ party to monitor leak flow sensors located at a residence or company and provide alarms or send messages to the client when water leak problems are detected. If the residence or company hires a $3^{rd}$ party or has account with a $3^{rd}$ party, an insurance company and/or municipality agencies, the Order, Management and Billing Component 508 will manage this service.

The server components provide access, and management of, the objects associated with an integrated broad. It is a location where modem/router 444 and remotely controllable base station 200 is located in a home or company, and is also commonly referred to as a site or premises; the site or premises can include any type of structure (e.g., home, office, warehouse, etc.) at which a modem/router 444 and the remotely controllable base station 200 are located. Remote devices can only access the networks to which they have been granted permission through activation (e.g. pairing process).

The low-level service management activities for the integrated system service. They define all of the remote devices, for example, the cell phone, smart phone or similar apparatus 400, computer browser 482, PC applications or programs 484 or TV 492 (internet capbability), associated with residential or corporate premise network, analyze how the devices interact, and trigger associated actions (such as sending signals to turn on or off the water system, or provide notifications to home or company owners). All changes in device states are monitored and logged for subsequent evaluation. The Business Components also manage all interactions with external systems as required, including sending alarms and other related self-monitoring data to the owners or the optional insurance, municipality agency or a third party monitoring station. The following Business Components manage the main elements of the integrated security system service, but the embodiment is not so limited: A Registry Manager 526 defines and manages remote devices and networks. This component is responsible for the creation, modification and termination of devices and networks. A Network Manager 524 defines and manages security and self-monitoring devices that are deployed on a network (site). This component handles the creation, modification, deletion and configuration of the devices, as well as the creation of automations, schedules and notification rules associated with those devices. A Data Manager 532 manages access to current and historical state data for an existing network and its devices. This component specifically does not provide any access to network management capabilities, such as adding new devices to a network, which are handled exclusively by the Network Manager 524. To achieve optimal performance for all types of queries, data for current device states is stored separately from, but linked together, in the historical activity data (a.k.a. "logs") in the database. A Log Data Manager 532 performs ongoing transfers of the device state data to the historical activity data log tables.

Additional Business Components direct manage communications with certain remote devices and systems. For example, Hub Manager 530 directly manages all communications with the remotely controlled base station 200 and the remote devices 480 receiving information about device state changes, changing the configuration of devices, and downloading new versions or software updates to the base station 200 and/or remote devices 480 hardware. A Notification Manager 528 is responsible for sending all notifications to clients via SMS (mobile phone messages), email (via a relay server like an SMTP email server), etc. The Element Management System 522 is a Business Component that manages all activities associated with service installation, scaling and monitoring, and filters and packages service operations data for use by the service management applications.

The Business Components store information about the objects that they manage in the Control Service Database 536. The Control Service Database 536 stores information about users, networks, devices and logged activities. This database interaction is performed via an appropriate interface. For security purposes, the various Business Components manage all data storage and retrieval. The various Business Components provide web services-based APIs that application components use to access the various Business Components' capabilities. Functions of application components include presenting integrated security system service data to end-users, performing administrative duties, and integrating with external systems and back-office applications.

The primary published APIs for the Business Components include, but are not limited to, the following: A Registry Manager API 518 provides access to the Registry Manager Business Component's functionality, allowing management of networks and devises. A Network Manager API 518 provides access to the Network Manager Business Component's functionality, allowing management of devices on a network. A Data Manager API 518 provides access to the Data Manager Business Component's functionality, such as setting and retrieving (current and historical) data about device states. A Provisioning API 516 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The Business Components also have an XML-based interface 538 for quickly adding support for new devices to the integrated security system. This interface 538 is a flexible, standards-based mechanism for defining the properties of new devices and how they can be managed. Although the format is flexible enough to allow the addition of any type of future device, pre-defined XML profiles are currently available for adding common types of devices such as sensors 540.

Once a user sets up a service, an Activation Application 494 delivers a first display to the user on either a display mean on the remotely controlled base station 200 and/or on a display means on the remote devices 480. This pairing technology or other application secure means associates a new user with a purchased remote device 480 and the remotely controlled base station 200. It primarily uses functionality published by the Provisioning API. Alternately, a Web Portal Application 496 can run on PC and cell phone browsers and delivers the web-based interface to the integrated system devices. This application allows users to manage their networks (e.g. add devices and create automations) as well as to view/change device states. Because of the wide scope of capabilities of this application, it uses three different Business Component APIs that include the Registry Manager API, Network Manager API, and Data Manager API. A Mobile Portal 500 is a small-footprint web-based interface that runs on mobile phones and PDAs. Potentially, the interaction with the Business Components is primarily via the Data Manager API. Custom portals and targeted client applications can be provided leveraging the same Business Component APIs used by the above applications. A Content Manager Application Component 498 delivers content to a variety of users. It sends multimedia-rich user interface components to widget container clients (both PC and browser-based), as well as to advanced touchscreen keypad clients.

A number of application components ensure overall management of the service. These pre-defined applications, referred to as Service Management Application Components 512, are configured to offer off-the-shelf solutions for production management of the integrated security system service including provisioning, overall service monitoring, customer support, and reporting, for example. The Service Management Application Components 512 allows service administrators to perform activities associated with service installation, scaling and monitoring/alerting. This application interacts heavily with the Element Management System 522 Business Component to execute its functionality, and also retrieves its monitoring data from that component via protocols such as SNMP MIBs. The CSR APP and Report Generator 510 is useful for provide reports in specific format for residential home owners and user, company owner and users, and/or the insurance company or a municipality agency. A Kitting Application 514 is used by employees performing service provisioning tasks.

Figure 12:
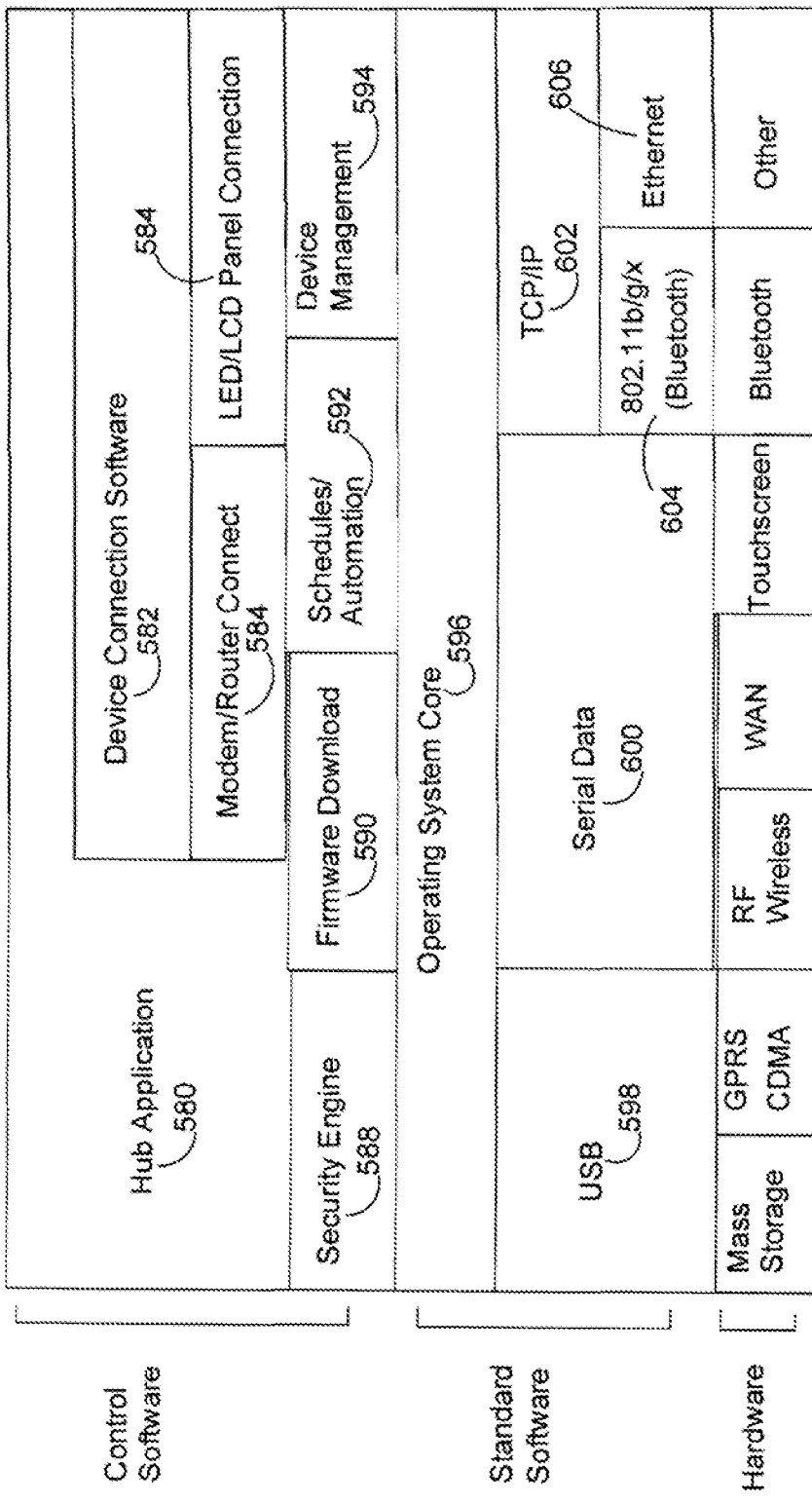
FIG. 12 is a block diagram of the more integrated software and applications.

FIG. 12 is a block diagram including base station software or applications. The base station software architecture has relatively small programmed instructions that are efficient, thereby simplifying its integration into other consumer appliances such as service routers. The software architecture also provides a high degree of security against unauthorized access. This section describes the various key components of the base station software architecture.

The control software includes a hub application layer 580 which is the main program that orchestrates the operations the device connection software 582, the modem/router connection 584 and the optional base LED/LCD panel connection 584. The Security Engine 588 provides robust protection against intentional and unintentional intrusion into the integrated remotely controllable base station 200 (both from inside the premises as well as from the WAN, LAN or Internet or outside premises). The Security Engine 588 comprises one or more sub-modules or components that perform functions including, but not limited to, the following: Encryption including 128-bit SSL encryption to provide secure communication. Bi-directional authentication between the remotely controllable base station 200 and the remote device 480 is used to confirm that the software instructs have been completed. Data sent from the modem/router server 444 to the remote device 480 (or vice versa) is digitally signed as an additional layer of security. Non-repudiation technology that prevents a sender from denying that a message, data or information was sent can be incorporated. Digital signing provides both authentication and validation that the data has not been altered in transit. The modem/router 444 provides for 128-bit SSL encapsulation of signal data sent over the internet 434 for complete integrity. Wireless IEEE 802.11b/g/n/x with WEP, WPA-PSK [TKIP], WPA2-PSK [AES], WPA-PSK [TKIP]+WPA2-PSK [AES] or other security protocol variant to ensure that signals and communications always takes place using the strongest available protection. Attempts to activate gateway-enabled devices by intentional and unintentional intrusion are detected by the Security Engine. Pairing remote devices 480 have the information with the correct serial number or activation key (pairing) can be activated for use with remotely controllable base station 200.

As standards evolve, and new encryption and authentication methods are proven to be useful, and older mechanisms proven to be breakable, the remote devices 480 and the remotely controllable base station 200 or components of the OSS/BSS can be upgraded by downloading updated software wirelessly or by a physically means of swapping out electrical components to provide new and better security for communications between the remote devices 480 and the remotely controllable base station 200.

A firmware download module 590 allows for secure updates to the modem/router 444 or remote device firmware through the Maintenance Application 594 providing a transparent, hassle-free mechanism for the service provider to deploy new features and bug fixes to the installed user base. The firmware download mechanism 590 is tolerant of connection loss, power interruption and user interventions (both intentional and unintentional). Such robustness reduces down time and customer support issues.

The schedules/automation engine 582 manages the user-defined rules of interaction between the different devices and for executing the user defined schedules of the off/on water system schedules.

Device connection software 582 includes definitions of all supported devices (e.g., key chains, mobile phones, water sensors, etc.) using a standardized plug-in architecture. The device connection module 582 offers an interface that can be used to quickly add support for any new device as well as enabling interoperability between devices that use different technologies/protocols. For common device types, pre-defined sub-modules have been defined, making supporting new devices of these types even easier.

The device management module 594 is in charge of all discovery, installation and configuration of both wired and wireless IP devices coupled or connected to the system. Networked IP devices require user configuration of many IP and security parameters to management module of an embodiment handles the details of this configuration. The device management module also manages the video routing module described below.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains and which fall within the limits of the appended claims.

The invention claimed is:

1. A building or structure water damage prevention system, said system comprising:
    a remotely controllable base station with a water shut-off/on or water control mechanism interposed between a water line from a water main and a water supply for said building or structure;
    said remotely controllable base station with said water shut-off/on mechanism being adapted to control the flow of water through said water supply to a residential home or industrial/commercial facility or building;
    a wireless chain or key fob apparatus;
    said remotely controllable base station including a recording compliance data means;
    said key chain or key fob apparatus includes electronic circuitry to send a wireless signal to said remotely controllable base station to turn said water supply on and off, and
    said key chain or key fob apparatus having the capability to receive a wireless electronic communication whereby said key chain or key fob apparatus includes an indicating means for determining an operational state or position of the shut-off/on mechanism.

2. A building or structure water damage prevention system as recited in claim 1, wherein said base station with remotely controllable base station with shut-off/on mechanism is interposed between the water supply line for a sprinkler system and the water line for said building or structure, such that such that operation of said sprinkler system is not interrupted by the activation of the base station with shut-off/on mechanism.

3. A building or structure water damage prevention system as recited in claim 1, wherein said water base station with shut-off/on mechanism further comprises a programmable time circuitry, said time circuitry being adapted to actuate the shut-off/on mechanism for a programmable determined time.

4. A building or structure water damage prevention system as recited in claim 1, further comprising a mechanical adaptor that enables an override to allow water flow when the base station with shut-off/on mechanism is activated.

5. A building or structure water damage prevention system as recited in claim 1, wherein said remotely controllable base station includes one of more flow sensors and can be programmed to turn off the water supply upon the detection of a leak by one or more flow sensors.

6. A building or structure water damage prevention system as recited in claim 5, further comprising a water turbine generator, solar cell and/or wind generation system to provide supplemental electrical energy to a battery source.

7. A building or structure water damage prevention system as recited in claim 1, wherein said shut-off/on mechanism includes a temperature sensor and/or freeze plug that is designed to initiate operations to prevent water pipe damage during freezing conditions.

8. A building or structure water damage prevention system, said system comprising:
    a remotely controllable base station with a water shut-off/on mechanism interposed between a water line from a water main and a water supply for said building or structure;
    said remotely controllable base station with a said water shut-off/on mechanism being adapted to control the flow of water through said water supply to a residential home or industrial/commercial facility or building;
    a wireless cell phone, smart phone or similar apparatus in wireless communication with said remotely controllable base station with shut-off/on mechanism;
    said remotely controllable base station including a recording compliance data means;
    said cell phone, smart phone or similar apparatus having an application ("APP"), that functions to cooperate with said cell phone, smart phone, or similar apparatus to send a wireless signal to said base station, said signal functions turning said water supply on or off;
    said cell phone, smart phone, or similar apparatus having an application that communicates wirelessly with said base station to receive a wireless communication that provides an indicating means for determining an operational state or position of the shut-off/on mechanism, and
    said cell phone, smart phone or similar apparatus having the capability to receive a wireless electronic communication whereby said cell phone, smart phone or similar apparatus includes an indicating means for determining the operational state or position of the shut-off/on mechanism.

9. A building or structure water damage prevention system as recited in claim 8, wherein said base station with remotely controllable base station with shut-off/on mechanism is interposed between the water supply line for a sprinkler system and the water line for a household or industrial/commercial building, such that such that operation of said sprinkler system is not interrupted by the activation of the base station with shut-off/on mechanism.

10. A building or structure water damage prevention system as recited in claim 8, wherein said water base station with shut-off/on mechanism further comprises a programmable time circuitry, said time circuitry being adapted to actuate the shut-off/on mechanism for a programmable determined time.

11. A building or structure water damage prevention system as recited in claim 8, further comprising a mechanical adaptor that enables an override to allow water flow when the base station with shut-off/on mechanism is activated.

12. A building or structure water damage prevention system as recited in claim 8, wherein said remotely controllable base station includes one of more flow sensors and can be programmed to turn off the water supply upon the detection of a leak by one or more flow sensors.

13. A building or structure water damage prevention system as recited in claim 12, further comprising a water turbine generator, solar cell and/or wind generation system to provide supplemental electrical energy to a battery source.

14. A building or structure water damage prevention system as recited in claim 8, wherein said shut-off/on mechanism includes a temperature sensor or freeze plug that is designed to initiate operations to prevents water pipe damage during freezing conditions.

15. A building or structure water damage prevention system as recited in claim 8, wherein said base station with water shut-off/on mechanism includes flow sensor to measure water volume that can be transfer water flow data or information to said cell phone, smart phone or similar apparatus, said base station with water shut-off/on mechanism and flow sensor interposed between a main water meter and the water supply for said building or structure, or functions as the main water meter.

16. A building or structure water damage prevention system as recited in claim 8, wherein said base station with shut-off/on mechanism can be programmed to follow a specific schedule for interrupting the water flow or allowing the water flow into the building or structure.

17. A building or structure water damage prevention system as recited in claim 8, wherein said remotely controllable base station and said wireless cell phone, smart phone or similar apparatus includes pairing technology to provide a specific wireless communication means between said remotely controllable base station and said wireless cell phone, smart phone or similar apparatus.

18. A building or structure water damage prevention system as recited in claim 8, wherein said wireless communication between said remotely controllable base station and said cell phone, smart phone or similar apparatus utilizes a remote operation service center to provide further integrity of communication signals.

19. building or structure water damage prevention system as recited in claim 8, wherein said remotely controllable base station calls or sends a text message to the phone, smart phone or similar apparatus when the phone, smart phone or similar apparatus is a defined distance from the remotely controllable base station when the water has not been turned off.

20. building or structure water damage prevention system as recited in claim 8, wherein said remotely controllable base station calls or sends a text message to the cell phone, smart phone or similar apparatus or communicates with a residential or industrial/commercial owner or municipality agency or insurance company when a leak is detected by one or more leak sensors.

21. A building or structure water damage prevention system, said system comprising:
   a remotely controllable base station with a water shut-off/on mechanism interposed between a water line from a water main and a water supply for said building or structure;
   said remotely controllable base station with a said water shut-off/on or mechanism being adapted to control the flow of water through said water supply to a residential home or industrial/commercial facility or building;
   an alarm or computer system;
   said remotely controllable base station including a recording compliance data means;
   said alarm or computer system includes electronic circuitry to send a wireless signal to said remotely controllable base station to turn said water supply on and off, said wireless signal utilizing encryption, authentic, integrity and/or non-repudiate technology, and
   said alarm or computer system having the capability to receive a wireless electronic communication whereby said alarm or computer includes an indicating means for determining an operational state or position of the shut-off/on mechanism.

22. A building or structure water damage prevention system, said system comprising:
   a remotely controllable base station with a water shut-off/on mechanism interposed between a water line from a water main and a water supply for said building or structure;
   said remotely controllable base station with a said water shut-off/on mechanism being adapted to control the flow of water through said water supply to a residential home or industrial/commercial facility or building;
   a wireless garage door opener apparatus;
   said remotely controllable base station including a recording compliance data means;
   said wireless garage door opener apparatus includes electronic circuitry to send a wireless signal to said remotely controllable base station to turn said water supply on and off, and
   said wireless garage door opener apparatus having the capability to receive a wireless electronic communication whereby said wireless garage opener includes having an indicating means for determining an operational state or position of the shut-off/on mechanism.

23. A building or structure water damage prevention system as recited in claim 21 wherein said remotely controllable base station includes one of more flow sensors and can be programmed to turn off the water supply upon the detection of a leak by one or more flow sensors.

24. A building or structure water damage prevention system as recited in claim 22 wherein said remotely controllable base station includes one or more flow sensors and can be programmed to turn off the water supply upon the detection of a leak by one or more flow sensors.

25. A building or structure water damage prevention system as recited in claim 1, said wireless key chain or key fob apparatus and said remotely controllable base station requires an initial pairing operation to provide a specific wireless communication means between with said wireless key chain or key fob apparatus and said remotely controllable base station.

26. A building or structure water damage prevention system as recited in claim 21, said alarm or computer system and said remotely controllable base station requires an initial pairing technology to provide a specific wireless communication means between with said alarm or computer system and said remotely controllable base station.

27. A building or structure water damage prevention system as recited in claim 22, said wireless garage door opener and said remotely controllable base station requires an initial pairing technology to provide a specific wireless communication means between with said wireless garage door opener and said remotely controllable base station.

28. A building or structure water damage prevention system as recited in claim 8, wherein said cell phone, smart phone or similar apparatus utilizes remote servers and software networks to increase the integrity of cell tower and WI-FI wireless communication.

* * * * *